Feb. 5, 1929.  1,701,168
R. B. WASSON
MEANS FOR AND METHOD OF TESTING MOTOR VEHICLE ENGINES
Filed Nov. 20, 1925  2 Sheets-Sheet 1
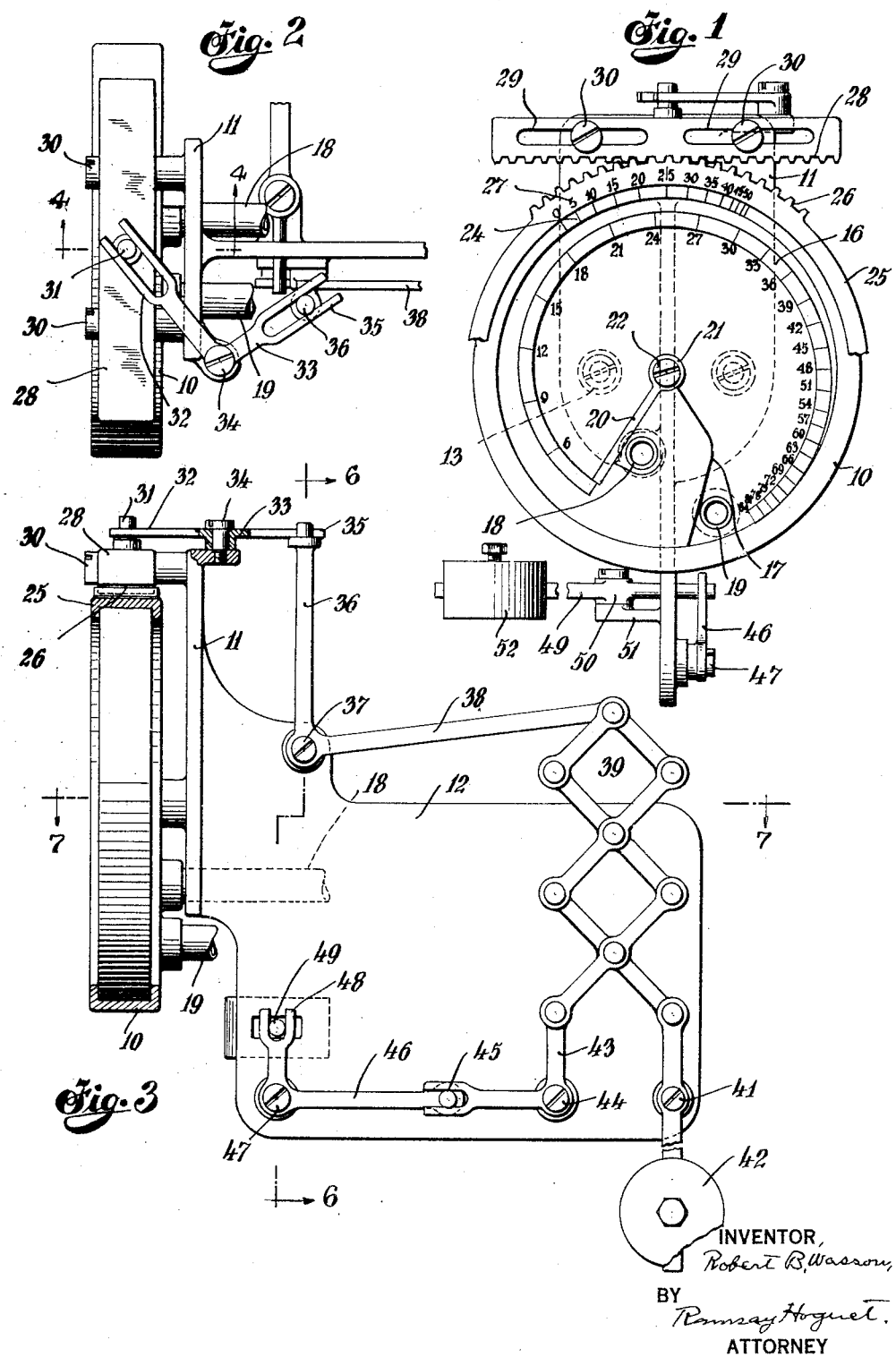

Feb. 5, 1929.
R. B. WASSON
1,701,168
MEANS FOR AND METHOD OF TESTING MOTOR VEHICLE ENGINES
Filed Nov. 20, 1925      2 Sheets-Sheet 2
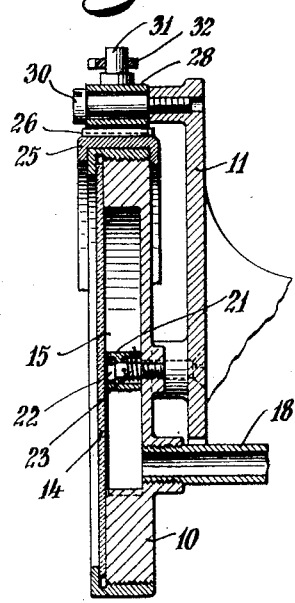
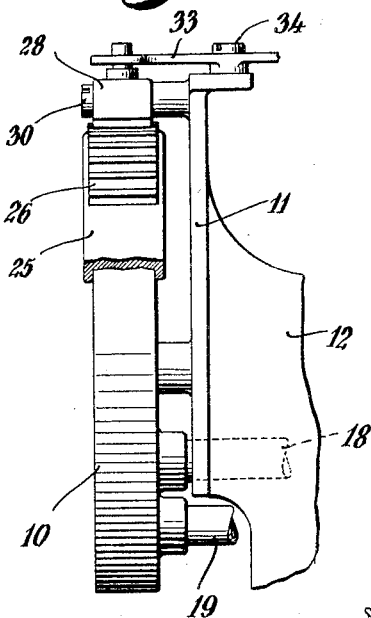
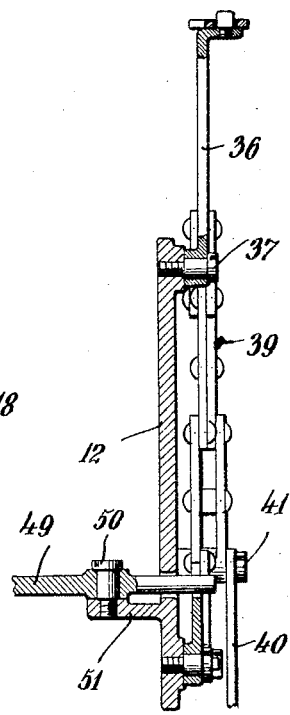
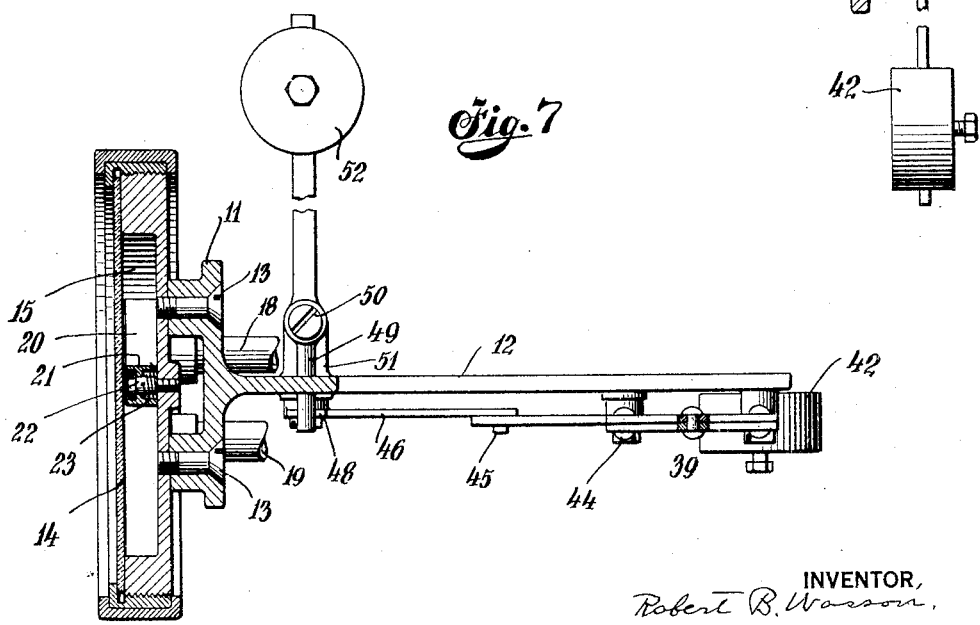
INVENTOR,
Robert B. Wasson,
BY
Ramsey Hoguet,
ATTORNEY Patented Feb. 5, 1929.

1,701,168

UNITED STATES PATENT OFFICE.

ROBERT B. WASSON, OF CRANFORD, NEW JERSEY.

MEANS FOR AND METHOD OF TESTING MOTOR-VEHICLE ENGINES.

Application filed November 20, 1925. Serial No. 70,427.

My invention relates to improvements in a means for and method of testing the engines or motors of motor vehicles while in use on the road, so as to give the actual performance of the motor in relation to or compared with its planned performance, and for this reason I term the apparatus a performometer. Every car manufacturer has certain standards which are supposed to be reached by actual road performance of his car and engine, but whether or not these standards are reached is practically guess work. My invention is intended to remedy this condition, and produce means for indicating at all times the actual road performance of the car with relation to such standards. A given amount of fuel should give a given amount of power at a given load factor, and while this is not possible in actual practice, my invention is intended to show at all times how nearly this ideal is being reached. To this end I arrange within easy sight of the car operator, and preferably on the instrument board, a fuel consumption indicator which will indicate the consumption of fuel at all times and at the rate of travel per hour, and in connection with the foregoing I arrange a miles per hour table which can be set so that the standard requirement of the rate of fuel consumption at a given speed is immediately observable. I preferably arrange a common index for the fuel consumption indicator and the standard or theoretical miles per hour table, so that the index will be applicable to both tables and show the rate of fuel consumption at a given speed rate. The miles per hour table, therefore, acts as a theoretical speed indicator. The miles per hour table can be set so as to correspond to the standard of the car, and it is movable with relation to the fuel consumption indicator so as to be responsive to changes in the pitch of the road, and consequently of the car, and also to changes of velocity. These two factors are arranged to cooperate with each other to make the table correspond to actual road conditions and acceleration or deceleration, and I find that the simplest way to accomplish this result is to have a lazy tongs connection with the miles per hour table, one member of the lazy tongs being connected to a vertically hanging and weighted arm which will therefore be responsive to changes of pitch of the road and car, and the other arm of the lazy tongs being similarly connected to a horizontally swinging weight which is responsive to acceleration and deceleration of velocity and therefore the table indicating miles per hour will be governed by these two opposed factors of change in velocity and in pitch so as to keep the table in such a position with relation to the fuel consumption indicator as will correspond to the actual changes of road and change of speed. The car will of course be provided with a preferred form of speedometer, and thus the driver can see at a glance what the car is actually doing on a given fuel consumption, and also see what the car should do under such a rate of consumption, and therefore he can tell at once accurately and definitely whether the car is performing up to standard.

I have referred to a lazy tongs connection between the weighted members responsive to acceleration and deceleration of speed and changes of pitch, but from the description which follows it will be evident that this is simply a preferred way of carrying my invention into effect and that other means for keeping the miles per hour table in right relation to the fuel consumption indicator can be used without affecting the invention, as I believe it to be broadly new to employ these two factors in the way described as a means to actually determine the road performance of a car and engine. All of which will be better understood from the description which follows.

Reference is to be had to the accompanying drawings forming a part of this specification, in which similar reference characters indicate corresponding parts in all the views.

Figure 1 is a broken front elevation of the apparatus embodying my invention.

Figure 2 is a broken plan view thereof.

Figure 3 is a broken side elevation.

Figure 4 is a section on the line 4—4 of Figure 2.

Figure 5 is a broken detail section of a part of the apparatus looking from the side edge.

Figure 6 is a vertical section on the line 6—6 of Figure 3, and

Figure 7 is a horizontal section on the line 7—7 of Figure 3.

The drawings are by way of example, as the structure can be very materially changed without affecting the invention. As illustrated the fuel consumption indicator has a casing 10 which is attached to a support 11, which may be the instrument board, and which is provided with a lateral extension 12, the casing being secured to the support 11 by means of screws 13 or equivalent means of attachment. The casing has on the front side a transparent plate 14 covering the chamber 15 which is preferably of generally helical shape, and around the front of which near the periphery, is a table 16 calculated to indicate the rate of fuel consumption per hour. Within the chamber 15 and preferably on the lower part is a fixed abutment 17, on one side of which is the fuel intake 18 and at the other the fuel exhaust 19. An index or hand 20, which is also a piston, moves in the chamber 15, and the length of the index approximates the shortest radius of the chamber, so that as the piston or index is moved in its circular path, more and more of the inflowing fuel will pass the outer end of the piston. Obviously the chamber might be differently shaped to permit this spilling action of the fuel past the piston, but the means illustrated works satisfactorily and is simple. The piston can be pivotally supported in any convenient way, and I have shown it provided with a journal 21 turning on a stud 22, and normally pressed towards the intake by the spring 23.

Opposite the table 16 and preferably just above it, are graduated marks 24 indicating the rated miles per hour on a given fuel consumption, these marks being on the sector 25 which turns on the casing 10, the sector having teeth 26 to be engaged with and operated by the rack, and having the figures 27 thereon placed to indicate the rated miles per hour on a given fuel consumption. This table in connection with its grade marks and those indicating fuel consumption, is set so as to indicate the performance for a given car, and it can be set at the proper point. As illustrated the index 20 acts as a common index for both tables 16 and 27, and for example if the piston is moved to indicate 25 miles on the table 27, it will show a fuel consumption of 25 pounds. These figures of course are arbitrary and can be changed to meet various conditions.

The fuel consumption will obviously vary with the road conditions and with accelerations or decelerations of speed, and as these vary frequently, the table 27 is correspondingly varied by means responsive to changes of road pitch and of such accelerations or decelerations of velocity. As a convenient means of changing the position of the table 27, I show a toothed rack 28 connected with the teeth 26 of the sector 25, and this rack is provided with longitudinal slots 29 through which extend the screw studs 30 serving to guide and support the rack, the studs being attached to the support 11 or other equivalent structure. The rack 28 has on the top a pin 31 which enters the forked end 32 of the bell crank lever 33, this being pivoted at its elbow as shown at 34, and having its second arm forked as shown at 35 and connecting with the upper end of a bell crank 36 which is pivoted as shown at 37 and has its lower arm 38 connected to the upper end of a lazy tongs 39. One arm of the lazy tongs connects with a vertically hanging weight arm 40 which is pivoted on the support 12 as shown at 41, and is provided with an adjustable weight 42, and as this arm 40 swings vertically under the impulse of its weight it will obviously be responsive to the change in pitch of the car or roadbed. The second arm of the lazy tongs 39 connects with a bell crank 43 which is also pivoted on the support 12 as illustrated at 44, and the second arm of the bell crank 43 has a free connection shown at 45 with a bell crank 46 which is pivoted as shown at 47, and has its upwardly extending second arm forked as shown at 48 and connected with the end of a horizontally swinging lever 49 which is pivoted as shown at 50 on a bracket 51, and has a weight 52 adjustable thereon. The weight 52 will therefore swing horizontally responsive to acceleration or deceleration in velocity, while the weight 42 swings responsive with such changes of pitch, and thus the two weights cooperate with one another and serve to position the miles per hour table 27 according to the actual conditions of speed and road or grade.

Thus in increases of speed or pitch the table 27 will be moved to the left as shown in Figure 1, as the fuel consumption rate would be obviously increasing under these conditions, while on easy going or down hill, the table will be moved in the opposite direction as the fuel consumption would be less, but in any event the road changes and speed changes are transmitted so as to move the table in response to such changes, with a tendency to hold the table in a position of equilibrium, and the piston 20 which serves also as an index, will thus indicate the proper speed of the car under a given rate of fuel consumption and under varying conditions. The driver can then observe his speedometer to see the actual speed of the car, and observing the theoretical speed indicator and fuel consumption indicator, will see what the car should be doing under such actual conditions. Therefore he knows at once whether the car and engine are performing up to standard, and if not, knows that there is difficulty and that it should be remedied.

From the foregoing description it will be evident that the mechanism which I show while novel and adapted for the intended purpose, can be greatly changed without affecting the invention, which broadly consists in utilizing means for showing fuel consumption and the standard rate per hour for such consumption, responsive to actual changes in velocity and road conditions, to the end that this standard can be compared with the actual performance at the time.

I claim:—

1. In an apparatus of the kind described, a fuel consumption indicator having a table, a rated miles per hour indicator having a table opposite that of the fuel consumption indicator, means for adjusting the tables with relation to each other, and a common index for both tables.

2. In an apparatus of the kind described, a fuel consumption indicator having a table, a rated miles per hour table opposite the table of the fuel consumption indicator and movable and adjustable in relation thereto, and a common index for the two tables.

3. In an apparatus of the kind described, a fuel consumption indicator having a table and a transparent face, and a piston behind the face responsive to the flow of fuel through the indicator and acting as an index or hand.

4. In an apparatus of the kind described, a fuel consumption indicator having a table, a rated miles per hour table opposite the said indicator table, and a piston movable in a circular path in the fuel consumption indicator responsive to the flow of fuel therethrough and acting as an index for both tables.

5. In an apparatus of the kind described, a fuel consumption indicator having a table, a rated miles per hour table opposite the said indicator table and means for moving the miles per hour table in response to the pitch of an adjacent part, and an index for the tables.

6. In an apparatus of the kind described, a fuel consumption indicator having a table, a rated miles per hour table opposite the indicator table and means for moving the miles per hour table in response to the change of speed and pitch of its carrier, and an index for the tables.

7. An apparatus of the kind described comprising a fuel consumption indicator having a table, a rated miles per hour table in readable and movable relation to said indicator table, weights responsive to the speed and pitch of the carrier of the apparatus, and means actuated by said weights for moving the miles per hour table.

8. An apparatus of the kind described comprising a fuel consumption indicator having a table, a rated miles per hour table in readable and movable relation to the said indicator table, weights responsive to the speed and pitch of the carrier of the apparatus, and means including a lazy tongs for transmitting the movement of the weights to the miles per hour table.

9. An apparatus of the kind described comprising a fuel consumption indicator having a table, a rated miles per hour table in readable and movable relation to said indicator table, weights moving in horizontal and vertical planes and connecting with the arms of a lazy tongs, whereby the forces act against each other, and an operative connection between the lazy tongs and the miles per hour table for moving the latter.

10. In an apparatus of the kind described the combination with a motor vehicle, of a rated miles per hour table thereon, and means for moving the table in response to the change of road and speed of the vehicle, and a fuel consumption indicator having an index arranged to show the fuel consumption per hour and also show the position of the miles per hour table with respect to such consumption.

11. The herein described method of determining the actual road performance of a motor vehicle, which comprises moving a miles per hour table by the pitch and speed variations of the car, measuring the flow of fuel per hour to the motor, and indicating the flow with relation to the position of said miles per hour table.

12. The herein described method of determining the road performance of a motor vehicle which comprises measuring the rate per hour of fuel consumption, indicating such consumption in relation to a table representing theoretically correct miles per hour at said fuel consumption rate, and moving the miles per hour table in response to changes of speed and pitch of the vehicle, thus furnishing data for comparing the theoretical and actual performance of the vehicle.

13. An apparatus of the character described, comprising a fuel consumption indicator having a graduated table, a member having a table graduated in terms of speed, the two graduated tables being placed near each other for comparative reading, means for changing the relative placement of the tables, and an index movable in proportion to fuel consumption, cooperating with the tables.

14. An apparatus of the character described, comprising a fuel consumption indicator having a graduated table, a member having a table graduated in terms of speed, the two graduated tables being placed near each other for comparative reading, means actuated by changes of road grade for changing the relative placement of the tables, and an index movable in proportion to fuel consumption, cooperating with the tables.

15. An apparatus of the character described, comprising a fuel consumption indicator having a graduated table, a member having a table graduated in terms of speed, the two graduated tables being placed near each other for comparative reading, means actuated by change of speed of the vehicle for changing the relative placement of the tables, and an index movable in proportion to fuel consumption, cooperating with the tables.

16. An apparatus of the character described, comprising a fuel consumption indicator having a graduated table, a member having a table graduated in terms of speed, the two graduated tables being placed near each other for comparative reading, means controlled by changes of road grade and by the speed of the vehicle for changing the relative placement of the tables, and an index movable in proportion to fuel consumption, cooperating with the tables.

17. An apparatus of the character described, comprising a member graduated in terms of standard motor vehicle performance, and a piston indicator cooperating with the graduated member, actuated directly by the pressure upon it of the liquid fuel being consumed by the engine of the vehicle, the position of the indicator with relation to the graduated member showing whether the engine performance is above or below standard.

18. An apparatus for testing motor vehicle performance, comprising a casing through which liquid fuel flows on its way to the engine, a piston indicator in the casing, movable in response to the variable pressure of fuel upon it, a table graduated in terms of standard engine performance, and means for rendering visible the movement of said piston indicator and comparing it with the graduations on the table.

In testimony whereof, I have signed my name to this specification this 18th day of November, 1925.

ROBERT B. WASSON.